(12) United States Patent
Allegre et al.

(10) Patent No.: US 10,179,491 B2
(45) Date of Patent: Jan. 15, 2019

(54) STRUT ROD MADE OF COMPOSITE MATERIAL FOR SUSPENSION OF FRONT AXLE OF VEHICLE

(71) Applicants: PEUGEOT CITROEN AUTOMOBILES SA, Velizy Villacoublay (FR); KYB Corporation, Tokyo (JP)

(72) Inventors: Jean Marc Allegre, Limours (FR); Vincent Hernette, Paris (FR)

(73) Assignee: KYB Corporation, Tokyo (JP)

(*) Notice: Subject to any disclaimer, the term of this patent is extended or adjusted under 35 U.S.C. 154(b) by 40 days.

(21) Appl. No.: 15/512,360

(22) PCT Filed: Sep. 22, 2015

(86) PCT No.: PCT/EP2015/071682
§ 371 (c)(1),
(2) Date: Mar. 17, 2017

(87) PCT Pub. No.: WO2016/046181
PCT Pub. Date: Mar. 31, 2016

(65) Prior Publication Data
US 2017/0274718 A1    Sep. 28, 2017

(30) Foreign Application Priority Data
Sep. 24, 2014  (FR) ..................................... 14 58989

(51) Int. Cl.
*B60G 7/02*    (2006.01)
*B62D 7/18*    (2006.01)
(Continued)

(52) U.S. Cl.
CPC ............. *B60G 13/005* (2013.01); *B60G 7/02* (2013.01); *B60G 13/003* (2013.01); *B62D 7/18* (2013.01);
(Continued)

(58) Field of Classification Search
CPC ................ B60G 13/001; B60G 13/005; B60G 2206/50; B60G 2204/129;
(Continued)

(56) References Cited

U.S. PATENT DOCUMENTS 4,321,988 A  *  3/1982  Bich .................... B60G 13/006
                                                188/321.11
4,478,396 A  * 10/1984  Kawaura ............... B60G 13/006
                                                188/321.11
(Continued)

FOREIGN PATENT DOCUMENTS

WO    WO-2009110256 A1  *  9/2009  ........... B60G 13/006
WO    WO-2014/128131 A1     8/2014

*Primary Examiner* — Laura Freedman
(74) *Attorney, Agent, or Firm* — Rabin & Berdo, P.C.

(57) ABSTRACT

The invention relates to a strut rod made of composite material for a suspension of a front axle of a vehicle, including: an upper part coupled to a rod and piston assembly connected to a vehicle body; and a U-shaped lower part including two brackets for fixing a knuckle arm of the vehicle. This strut rod includes means for detecting a crack. This detection means includes at least one additional edge positioned so as to project from an outer surface of the U-shaped lower part of the strut rod in a region where a crack possibly occurs in the case of an accidental shock on a wheel of the vehicle.

7 Claims, 3 Drawing Sheets

(51) Int. Cl.
*F16F 9/54* (2006.01)
*B60G 13/00* (2006.01)

(52) U.S. Cl.
CPC .............. *F16F 9/54* (2013.01); *B60G 13/001* (2013.01); *B60G 2200/142* (2013.01); *B60G 2204/129* (2013.01); *B60G 2204/148* (2013.01); *B60G 2204/43* (2013.01); *B60G 2204/4302* (2013.01); *B60G 2204/4304* (2013.01); *B60G 2204/4306* (2013.01); *B60G 2206/50* (2013.01); *B60G 2206/7101* (2013.01); *B60G 2800/80* (2013.01)

(58) Field of Classification Search
CPC .......... B60G 2204/148; B60G 2204/43; B60G 2204/4302; B60G 2204/4304; B60G 2204/4306; B60G 2600/08; B60G 7/02; B60G 13/003; B60G 2800/80; B60G 2200/142; B60G 2206/7101; F16F 9/54; B62D 7/18
See application file for complete search history.

(56) References Cited

U.S. PATENT DOCUMENTS

| | | | | | |
|---|---|---|---|---|---|
| 4,491,339 | A | * | 1/1985 | Mizumukai | B60G 13/006 188/321.11 |
| 4,706,987 | A | * | 11/1987 | Pettibone | B60G 3/205 280/86.753 |
| 5,180,129 | A | * | 1/1993 | Yamaoka | B60G 13/006 248/230.1 |
| 5,669,728 | A | * | 9/1997 | Koba | B60G 15/07 188/322.19 |
| 6,367,751 | B1 | * | 4/2002 | Perrott | B60G 13/005 248/218.4 |
| 7,793,971 | B2 | * | 9/2010 | Sakashita | B60G 13/005 188/321.11 |
| 8,322,500 | B2 | * | 12/2012 | Obrecht | B60G 15/063 188/266.6 |
| 9,662,948 | B2 | * | 5/2017 | Asaoka | F16F 9/3242 |
| 2002/0135213 | A1 | * | 9/2002 | Fullenkamp | B60G 15/063 297/311 |
| 2016/0031282 | A1 | | 2/2016 | Hernette et al. | |
| 2016/0137017 | A1 | * | 5/2016 | Wilkin | B60G 15/063 267/221 |

* cited by examiner

US 10,179,491 B2

STRUT ROD MADE OF COMPOSITE MATERIAL FOR SUSPENSION OF FRONT AXLE OF VEHICLE

TECHNICAL FIELD

The present invention relates to a strut rod made of composite material for a suspension of a front axle of a vehicle. It also relates to a vehicle, in particular an automotive vehicle, that includes at least one such strut rod made of composite material in a suspension of a front axle.

BACKGROUND ART

Conventionally, various apparatuses of a suspension or a shock absorber of a vehicle includes a strut rod, and this strut rod has: one end coupled to a knuckle arm of one of wheels of a front axle of the vehicle; and the other end coupled to a mechanical assembly of the shock absorber constituted of a rod and a piston and also fixed to a body of the vehicle.

When the strut rod is made of composite material, the strut rod can be fabricated by a single operation and allows a relatively large mass gain compared with a metal strut rod. An expression "composite material" conventionally means a tight assembly of at least two components having properties complementary to each other and is composed of at least a base material and a reinforcing material.

A shock absorber apparatus for a front axle of a vehicle has been known from WO 2014/128131. This apparatus includes a strut rod, and this strut rod has: one hand including a metal inner part provided with a first upper end and lower end; and the other hand including an outer part overmolded on the inner part excluding at least the first upper end. This overmolded outer part is made of a composite material and includes: a second upper end on which the first upper end is folded; a middle part having a cup (coupelle) that defines a support surface for a suspension spring; and a second lower end surrounding the first lower end and including two substantially-parallel brackets, the two brackets being configured to be connected to the knuckle arm of the front axle. Furthermore, the metal inner part includes a first protrusion positioned below the first upper end, and a second protrusion positioned above the first lower end.

SUMMARY OF INVENTION

However, while the metal strut rod is bent at an accidental shock such that a need for replacing parts is recognized by a simple visual check of a deformation, a strut rod made of composite material may present no obvious degradation at an equivalent accidental shock, which brings a harmful consequence of underestimating a seriously realistic security risk for a passenger of the vehicle.

It is an object of the present invention to provide a strut rod made of composite material for preventing the above-mentioned inconvenience. That is, the strut rod is provided with a secure and simple means for detecting a resulting small crack or a trigger factor for rupture on the strut rod.

It is another object of the present invention to provide such a robust, reliable, and economical strut rod that is designed and fabricated in a simple manner.

In order to achieve these objects, the present invention is directed to a strut rod made of composite material for a suspension of a front axle of a vehicle, and this strut rod includes an upper part coupled to a rod-piston assembly fixed to a body of the vehicle, and a U-shaped lower part having two brackets for fixing a knuckle arm of the vehicle. A new strut rod made of composite material includes means for detecting a trigger factor for rupture or crack. This detection means includes at least one additional edge positioned so as to project from an outer surface of the U-shaped lower part of the strut rod, in a region where a crack possibly occurs in the case of an accidental shock on a wheel of the vehicle.

Preferably, the at least one additional edge is directed to a direction substantially perpendicular to a preferential direction of the crack under an impact of the accidental shock.

In one preferred embodiment of the invention, this at least one additional edge is positioned so as to project from a front surface of an end portion of one bracket of the two brackets forming a U-shape for fixing the knuckle arm, and the additional edge is cracked in the case of an accidental shock on a wheel of the vehicle. Then, the presence of the visible crack informs a technical operator of a need for replacing the strut rod.

Also, in one preferred embodiment of the invention, the front surfaces of the end portions of the respective brackets of the U-shaped fixing part are curved and formed of two adjacent circular-arc sections that are connected by intermediate circular sections, and an additional edge is positioned on a lower section of the circular arc.

Preferably, the at least one additional edge is fabricated as "monoblock" with a bracket of the U-shaped fixing part on which this edge is positioned, the edge being fabricated by an molding operation known per se, and thus during an molding operation of the strut rod. In consequence, a slight modification of a mold of the strut rod is sufficient for obtaining this additional edge, the presence of which being a base of the present invention.

The present invention is also directed to a vehicle, in particular an automotive vehicle, including a front axle having a suspension apparatus of a type of the strut rod made of composite material, the strut rod being those described above in a broad sense.

Other objects, advantages, and characteristics of the invention will become apparent from the following description of one non-limiting embodiment for an object and range of the present patent application accompanying drawings incorporated herein.

DESCRIPTION OF EMBODIMENTS

Figure 1:
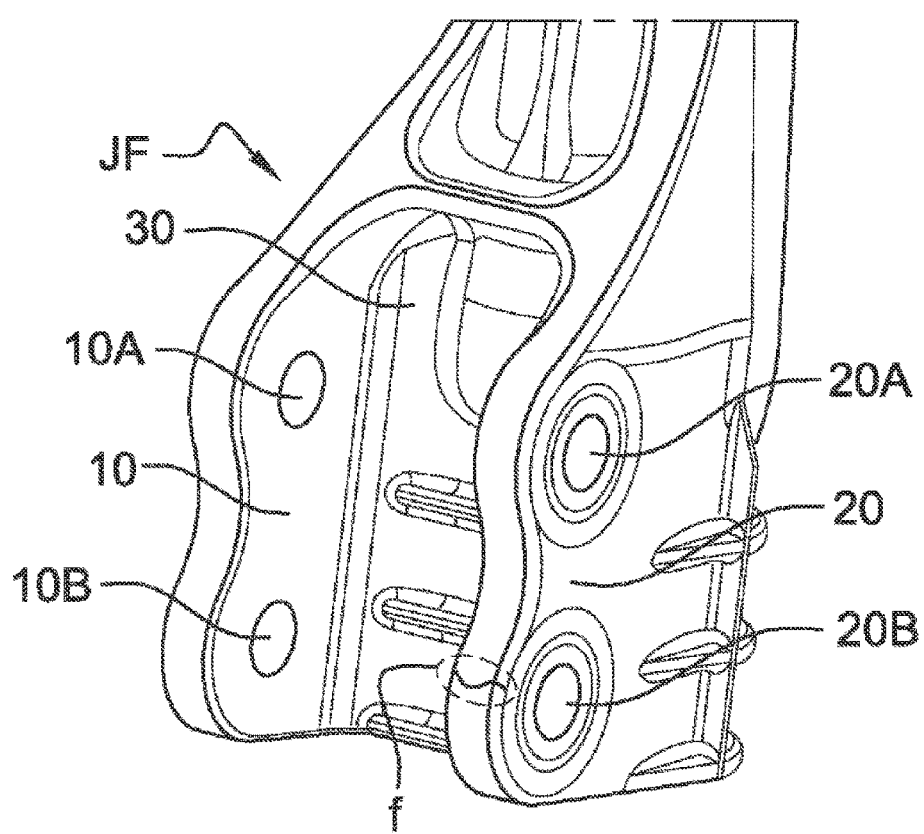
FIG. 1 is a perspective view schematically showing a lower part of the strut rod made of composite material according to a prior art, in which the strut rod is designed for a shock absorber apparatus mounted on a front axle of an automotive vehicle.

Referring to FIG. 1, one embodiment of a strut rod of a shock absorber apparatus for a front axle of an automotive vehicle known in the prior art is partially shown. This strut rod, which is designated by a reference character in general JF, is fabricated as "monoblock" made of composite material. An upper part of the strut rod, not shown, conventionally includes a cup that serves as a support surface for lower turns of a suspension spring, and a rod-piston assembly of the shock absorber is stored inside of the suspension spring. The lower part shown in the figure has a U-shape including two brackets respectively designated by reference numerals 10 and 20, and a center part or "bottom" of the U-shape, designated by a reference numeral 30, connects the two brackets 10 and 20. The two brackets 10 and 20 are substantially parallel and are configured to be fixed to the knuckle arm (not shown) of the front axle of the vehicle. The knuckle arm includes a wheel hub at a center thereof, and supports a brake caliper. A bottom of the knuckle arm connects an A-arm (le triangle de suspension) through a ball bearing, and the knuckle arm includes a horizontal lever connected to a steering link.

It is important to note that the knuckle arm includes a relatively thick fixing leg that is configured to be placed between the two brackets 10 and 20. The knuckle arm is connected to the U-shape by means of two screws, the bodies of which being inserted throughout cylindrical transverse orifices 10A, 10B and 20A, 20B respectively formed on the brackets 10 and 20.

Rigid ribs are collectively designated by a reference character N (FIGS. 2 and 3) and enhance rigidity of the two brackets 10 and 20 as well as the center part 30 of the U-shape.

Figure 2:
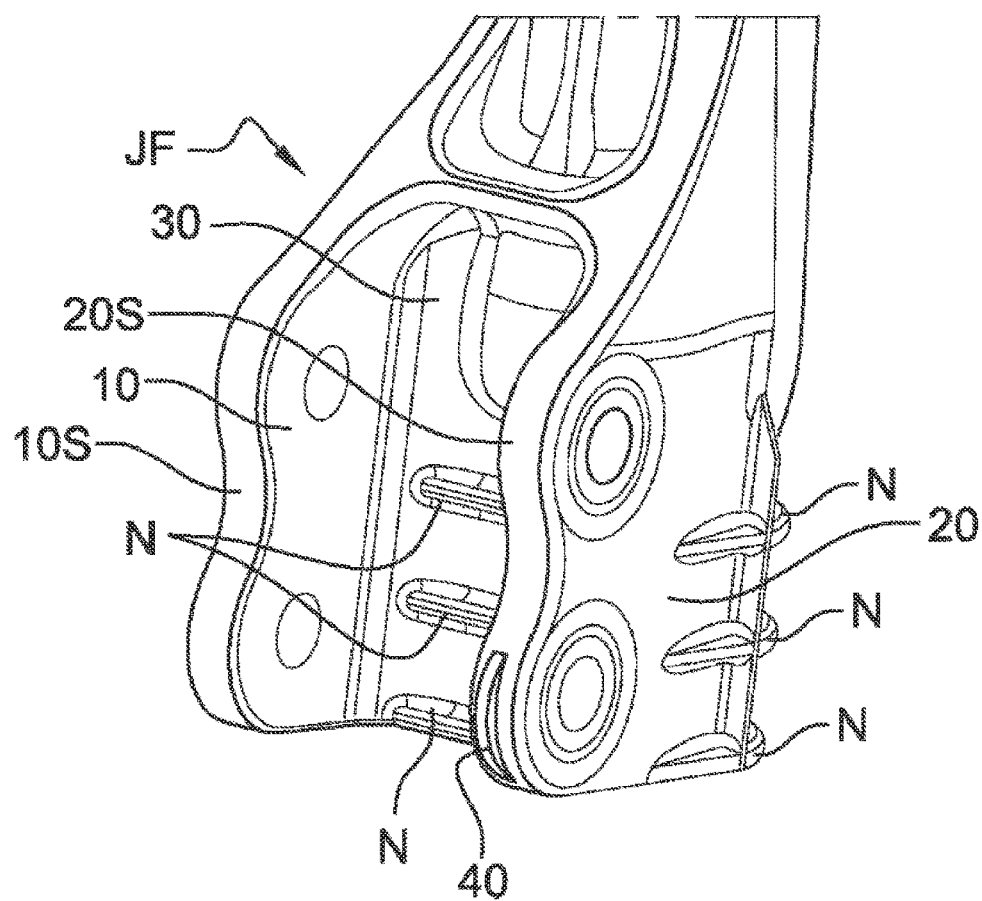
FIG. 2 is a perspective view schematically showing a lower part of the strut rod made of composite material according to the present invention, in which the strut rod is also designed for a shock absorber apparatus mounted on a front axle of an automotive vehicle.

Referring to FIG. 2, the brackets 10 and 20 have front surfaces of an end portion or "thickened surface" respectively designated by 10S and 20S, these surfaces having a width equal to a thickness of the bracket and being curved so as to "engage" with a shape of a double circular arc of a contour of the above-mentioned transverse orifices 10A, 10B, 20A, and 20B.

As illustrated in FIG. 1, the consequence of the accidental shock on the wheel of the vehicle may cause a crack at a position of one bracket of the U-shape, this crack is schematically shown on the bracket 20, and is designated by a reference character "f." Having such a crack "f" on a mechanical part such as strut rod can cause in consequence a "delamination" of the composite material, which may deteriorate retention of a wheel plane in the end, or even uncouple the strut rod from the knuckle arm, thus increasing a security risk for the passenger of the vehicle.

If the crack "f" is small, a technical operator who is in charge of remounting the shock absorber apparatus on the vehicle has a risk of missing the crack and proceed with remounting a defect strut rod to a vehicle.

According to a principle per se of the present invention, means for detecting even a small crack or trigger factor for rupture is provided. As shown in FIG. 2, this detection means is composed of an additional edge 40 positioned so as to project from the front surface of the end portion 20S of one of the two brackets of the U-shape. For merely an example, this additional edge 40 is shown on the bracket 20 of the U-shaped fixing part of the knuckle arm, more specifically, on an extended line from the front surface of the end portion 20S of the bracket 20.

Figure 3:
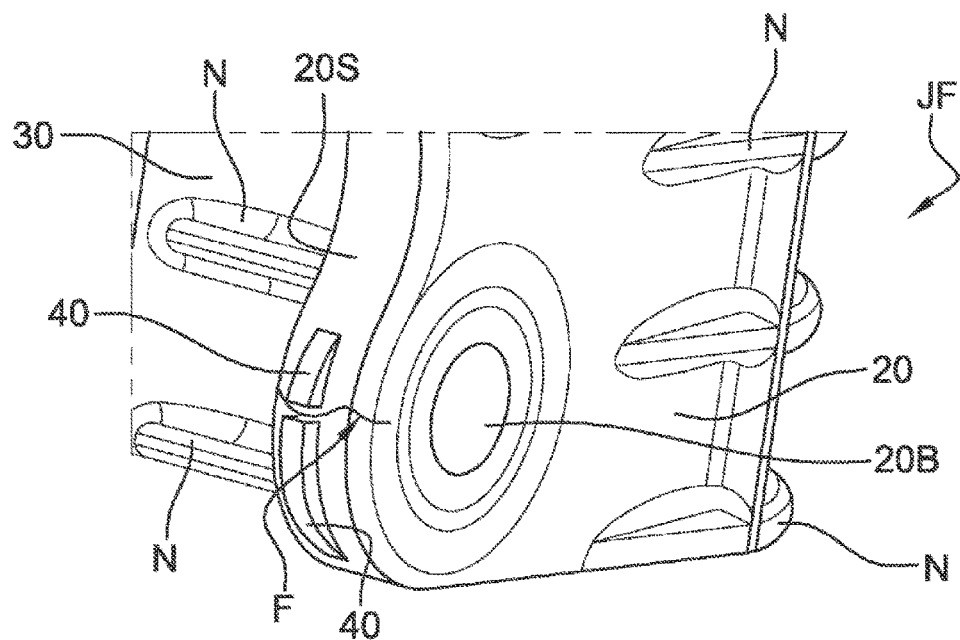
FIG. 3 illustrates an operation of the present invention, in which a part of the strut rod is incorporated in the additional edge shown in FIG. 2 after the accidental shock.

As shown in FIG. 3, this additional edge 40 is cracked in the case of an accidental shock, and the presence of this crack, represented and designated as "F" in FIG. 3, informs a technical operator of a need for replacing the strut rod.

This additional edge 40 is achieved by only slightly modifying a fabrication mold for the strut rod JF.

It is obvious that the above-described strut rod made of composite material is given as a non-limiting example of an object and range of the present invention. It is to be noted that, although the above-described example includes only one additional edge, variations of the embodiment of the strut rod according to the invention can include a plurality of additional edges in a plurality of regions where a rupture possibly occurs. It is also to be noted that the present invention can be applied mutatis mutandis to other mechanical parts than a strut rod, for example to the triangle of the suspension made of composite material for an axle of an automotive vehicle.

This strut rod made of composite material according to the invention described above presents many advantages, among which are the followings:

This strut rod includes means for visibly and reliably detecting a crack or trigger factor for rupture, which as a result greatly enhances a safety of a passenger of vehicle, thus avoiding a defect parts at the time of examination by a technical operator;

This strut rod can be designed and fabricated in a simple manner, and only a slight modification of a mold used for a unique operation of molding the strut rod is needed; and This strut rod is robust, reliable, and economical.

The invention claimed is:

1. A strut rod made of composite material for a suspension of a front axle of a vehicle, the strut rod comprising:
   an upper part coupled to a rod-piston assembly fixed to a body of the vehicle, and
   a U-shaped lower part including two brackets for fixing a knuckle arm of the vehicle, wherein
   the strut rod includes a detection means for detecting a crack, the detection means including at least one additional edge positioned so as to project from an outer surface of the U-shaped lower part of the strut rod, in a region where the crack possibly occurs in a case of an accidental shock on a wheel of the vehicle.

2. The strut rod according to claim 1, wherein the at least one additional edge is directed to a direction substantially perpendicular to a preferential direction of the crack under an impact of the accidental shock.

3. The strut rod according to claim 1, wherein
   the at least one additional edge is positioned so as to project from a front surface of an end portion of one bracket of the two brackets forming a U-shape for fixing the knuckle arm, the additional edge being configured to be cracked in the case of the accidental shock on the wheel of the vehicle of to indicate a need for replacing the strut rod.

4. The strut rod according to claim 1, wherein
   front surfaces of end portions of the respective brackets of the U-shaped lower part are curved and formed of two adjacent circular-arc sections that are connected by intermediate circular sections, and
   the at least one additional edge is positioned on a lower one of the circular-arc sections.

5. The strut rod according to claim 1, wherein the at least one additional edge is fabricated as a monoblock with the brackets of the U-shaped lower part on which the edge is positioned.

6. The strut rod according to claim 5, wherein the additional edge is fabricated by molding at a same time as the strut rod during a molding operation of the strut rod.

7. A vehicle, comprising:
   a front axle having a suspension apparatus of a type of the strut rod made of composite material, wherein the strut rod made of composite material is the strut rod described in claim 1.

\* \* \* \* \*